US008313025B2

(12) United States Patent
Saxena et al.

(10) Patent No.: US 8,313,025 B2
(45) **Date of Patent: *Nov. 20, 2012**

(54) WIRELESS DISPLAY TAG (WDT) USING ACTIVE AND BACKSCATTER TRANSCEIVERS

(75) Inventors: Sunit Saxena, Monte Sereno, CA (US); Anurag Goel, Foster City, CA (US); Mark Douglas McDonald, Campbell, CA (US)

(73) Assignee: Altierre Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/581,502

(22) Filed: Oct. 19, 2009

(65) Prior Publication Data

US 2010/0156605 A1 Jun. 24, 2010

Related U.S. Application Data

(63) Continuation-in-part of application No. 11/019,976, filed on Dec. 20, 2004, now Pat. No. 7,604,167.

(60) Provisional application No. 60/530,819, filed on Dec. 18, 2003, provisional application No. 60/530,818, filed on Dec. 18, 2003, provisional application No. 60/530,817, filed on Dec. 18, 2003, provisional application No. 60/530,816, filed on Dec. 18, 2003, provisional application No. 60/530,795, filed on Dec. 18, 2003, provisional application No. 60/530,790, filed on Dec. 18, 2003, provisional application No. 60/530,783, filed on Dec. 18, 2003, provisional application No. 60/530,823, filed on Dec. 18, 2013, provisional application No. 60/530,784, filed on Dec. 18, 2003, provisional application No. 60/530,782, filed on Dec. 18, 2003.

(51) Int. Cl.
*G06K 15/00* (2006.01)

(52) U.S. Cl. ........................................ 235/383; 235/492

(58) Field of Classification Search .................. 235/383, 235/385, 378, 487, 492
See application file for complete search history.

(56) References Cited

U.S. PATENT DOCUMENTS

| | | | |
|---|---|---|---|
| 3,609,741 | A | 9/1971 | Miller |
| 4,303,910 | A | 12/1981 | McCann |
| 4,740,779 | A | 4/1988 | Cleary et al. |
| 4,888,709 | A | 12/1989 | Revesz et al. |
| 4,896,319 | A | 1/1990 | Lidinsky et al. |
| 5,151,684 | A | 9/1992 | Johnsen |
| 5,241,467 | A | 8/1993 | Failing et al. |

(Continued)

FOREIGN PATENT DOCUMENTS

| | | |
|---|---|---|
| JP | 2003-030611 | 1/2003 |

(Continued)

OTHER PUBLICATIONS

Office action dated Dec. 14, 2010 in corresponding Japanese Patent Application No. 2006-545588 (2 pages).

*Primary Examiner* — Daniel St.Cyr
(74) *Attorney, Agent, or Firm* — DLA Piper LLP (US)

(57) ABSTRACT

A wireless display tag, adapted to fit within the C-channel of a shelf-edge, or otherwise usable as a hang tag or small identification device, includes, depending on implementation, an active transceiver, a passive transceiver, or both, with analog and digital control portions for managing communications with a host.

6 Claims, 13 Drawing Sheets

U.S. PATENT DOCUMENTS 5,465,085 A * 11/1995 Caldwell et al. ............. 340/5.91
5,510,602 A 4/1996 Evans et al.
5,539,393 A 7/1996 Barfod
5,668,560 A 9/1997 Evans et al.
5,686,902 A 11/1997 Reis et al.
5,797,132 A 8/1998 Altwasser
5,821,523 A 10/1998 Bunte et al.
5,873,025 A 2/1999 Evans et al.
5,914,671 A 6/1999 Tuttle
6,056,199 A * 5/2000 Wiklof et al. ............ 235/462.45
6,058,292 A 5/2000 Terreault
6,253,190 B1 6/2001 Sutherland
6,269,342 B1 7/2001 Brick et al.
6,307,919 B1 10/2001 Yoked
6,420,961 B1 7/2002 Bates et al.
6,543,688 B1 * 4/2003 Massaro ....................... 235/383
6,715,675 B1 4/2004 Rosenfeld
2002/0042741 A1 4/2002 Wilson, III et al.
2002/0057191 A1 5/2002 Bates et al.
2002/0122467 A1 9/2002 Camp, Jr. et al.
2003/0104848 A1 6/2003 Brideqlall
2005/0025218 A1 2/2005 Briles
2005/0057341 A1 3/2005 Roesner
2005/0218218 A1 * 10/2005 Koster .......................... 235/383

FOREIGN PATENT DOCUMENTS

JP 2003-288642 10/2003
JP Hei 08-185123 8/2008
JP Hei 09-27772 2/2009
WO WO 92/16901 10/1992
WO WO/00/55822 9/2000

* cited by examiner

WIRELESS DISPLAY TAG (WDT) USING ACTIVE AND BACKSCATTER TRANSCEIVERS

RELATED APPLICATIONS/PRIORITY CLAIMS

The present application is a continuation-in-part of and claims priority under 35 USC 120 to U.S. Pat. application Ser. No. 11/019,976 filed on Dec. 20, 2004 which is entitled "Wireless Display Tag (Wdt) Using Active And Backscatter Transceivers" (now U.S. Pat. No. 7,604,167) which in turn claims the benefit of priority under 35 USC 119(e) from the following United States provisional applications: U.S. patent Ser. No. 60/530,819 filed Dec. 18, 2003 entitled "Wireless Display Tag (WDT) Using Amplified Backscatter"; U.S. patent Ser. No. 60/530,818 filed Dec. 18, 2003 entitled "Wireless Display Tag (WDT) Using an Active Transmitter"; U.S. patent Ser. No. 60/530,817 filed Dec. 18, 2003 entitled "Wireless Display Tag (WDT) Using an Active Receiver"; U.S. patent Ser. No. 60/530,816 filed Dec. 18, 2003 entitled "Wireless Display Tag (WDT) Using an Active Transmitter and Diode Receiver"; U.S. patent Ser. No. 60/530,795 filed Dec. 18, 2003 entitled "Wireless Display Tag (WDT) Using Active and Backscatter Transceivers"; U.S. patent Ser. No. 60/530,790 filed Dec. 18, 2003 entitled "Wireless Display Tag (WDT) Unit"; U.S. patent Ser. No. 60/530,783 filed Dec. 18, 2003 entitled "RF Backscatter Transmission with Zero DC-Power Consumption"; U.S. patent Ser. No. 60/530,823 filed Dec. 18, 2003 entitled "Wireless Display Tag (WDT) Initialization; U.S. patent Ser. No. 60/530,784 filed Dec. 18, 2003 entitled "Wireless Display Tag (WDT) with Environmental Sensors"; and U.S. patent Ser. No. 60/530,782 filed Dec. 18, 2003 entitled "High Readability Display for a Wireless Display Tag (WDT)".

This application is also related to the following U.S. utility applications filed simultaneously herewith: U.S. patent application Ser. No. 11/019,660, filed Dec. 20, 2004 entitled "Error Free Method for Wireless Display Tag (WDT) Initialization"; U.S. patent application Ser. No. 11/019,494, filed Dec. 20, 2004 entitled "RF Backscatter Transmission with Zero DC Power Consumption" (now U.S. Pat. No. 7,369,019 issued on May 6, 2008); U.S. patent application Ser. No. 11/019,978 filed Dec. 20, 2004 entitled "Wireless Display Tag (WDT) Unit"; U.S. patent application Ser. No. 11/019,916 filed Dec. 20, 2004 entitled "Multi-Use Wireless Display Tag (WDT) Infrastructure and Methods" (now U.S. Pat. No. 7,413,121 issued on Aug. 19, 2008; and U.S. patent application Ser. No. 11/019,705 filed Dec. 20, 2004 entitled "Low Power Wireless Display Tag (WDT) Systems and Methods" (now U.S. Pat. No. 7,090,125 issued Aug. 15, 2006.

BACKGROUND

Traditional paper pricing labels for products presented on a shelf are being replaced by digital units. Digital units have an LCD display driven by digital logic. They typically are installed on the edge of the retail shelf. In some instances these digital units are capable of radio communication similar to the active radios commonly used by people, for example in car radios and cell phones.

Active radio transmission is well known technique of radio transmission where an active power source generates a radio-frequency (RF) wave that is modulated with information and the RF wave excites an antenna. Electro-magnetic radiation propagates from the transmitting antenna to a receiving antenna. A receiver, which may be either active or passive devices, collects the signal, demodulates it, and presents the demodulated information to the user. The advantage of using active radio transmission is that because of the active power source, signal strength is typically good and, hence, there is improved transmission range. However, the use of an active power source results in the need for a larger power supply and generation of heat, both of which are concerns in compact circuitry designs.

Other known methods of communication include a backscatter transceiver having a receiver and a transmitter. Backscatter transmission is a technique whereby signals are sent with typically lower power consumption than comparative techniques. The system requires a RF source and the transmitter. The source sends a radio wave over the air. The radio wave propagates from the source to the transmitter's antenna. What is commonly called a backscatter receiver is actually a diode demodulator for non-constant amplitude carrier reception. A backscatter transmitter does not have an active power source to generate an RF wave(s). An advantage of the backscatter transceiver is low power consumption and, hence, an effective design alternative. However, the problem with the backscatter transceivers is that the signal strength is low and, hence, the range is very limited. Thus, backscatter transceivers are not always effective when longer transmission range is desired.

Therefore what is needed is a system and method that communicate using radio communication using minimal power with low heat dissipation to allow for a compact and cost effective design solution, while providing for effective communication range based on the ability to generate strong radio communication signals when required.

SUMMARY

A system and method are provided communicate using radio communication using minimal power with low heat dissipation in a compact and cost effective design solution. The system includes a method that provides effective communication range based on the ability to generate strong radio communication signals.

In one embodiment, a combination of backscatter and active radio technologies is used to provide both long range and low power. An advantage of this combination is lower power consumption, although other advantages can be determined from the teachings set forth herein by those skilled in the art.

In an alternative embodiment, when long range is required, the higher-power consumption active radio is used.

In yet another embodiment, when short range is needed, then the lower-power consumption backscatter radio is used.

In an embodiment of the system, a digital unit is in communication with an In-Store Server (ISS) computer through either two-way Radio Frequency (RF) backscatter, infra-red (IR), or one-way RF. Two-way RF communication allows for an acknowledgement that the signal from the ISS or an intermediate access point router was received and properly interpreted and that the request successfully carried out is required. The ISS sends the digital unit the price and other information to be displayed.

DETAILED DESCRIPTION OF ONE OR MORE EMBODIMENTS

Figure 1:
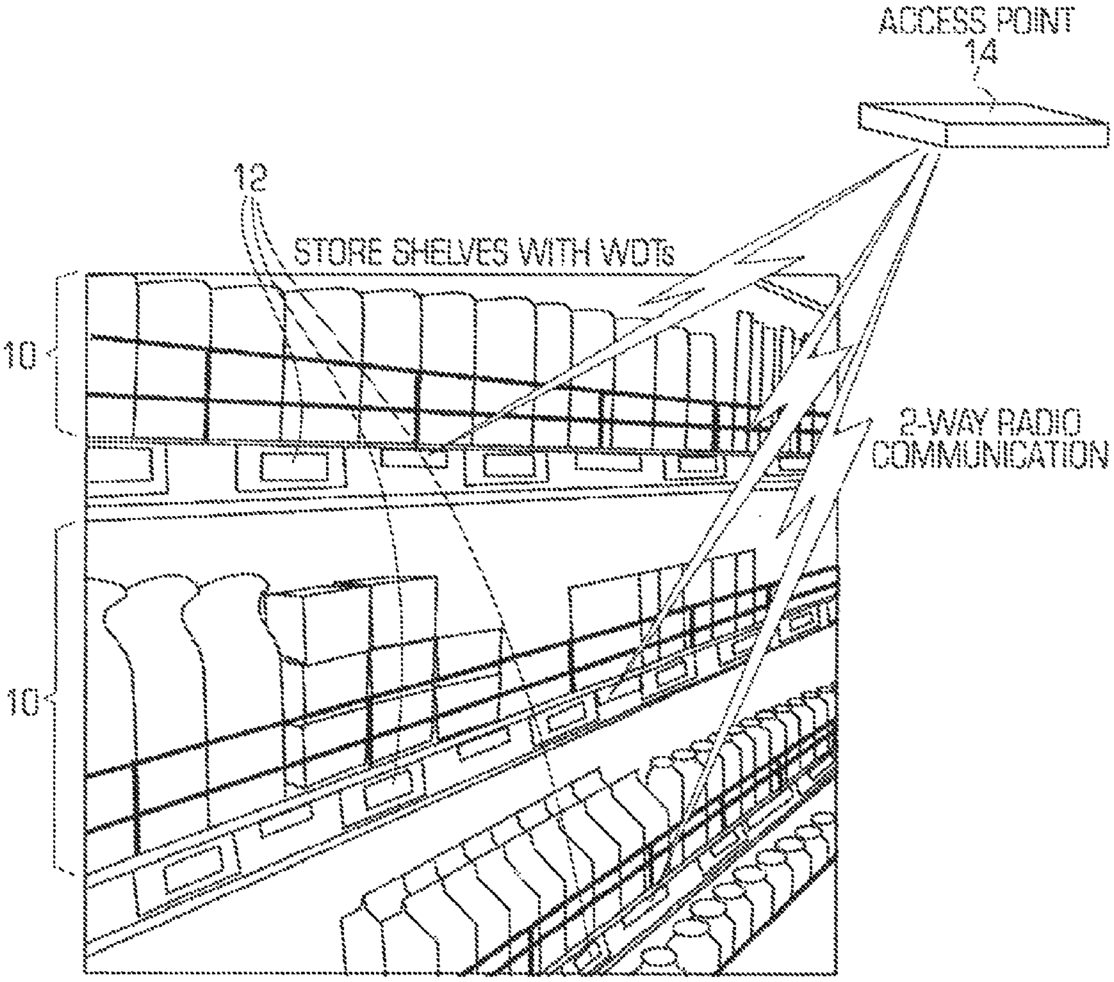
FIG. 1 shows an wireless access point device in communication with a plurality of display units or Wireless Display Terminals (WDTs) proximally located near products on a shelf in accordance with the present invention.

Referring now to FIG. 1, retailers place products 10 on shelves and indicate the pricing of the products 10 using display units or Wireless Display Terminals (WDTs) 12. The display units 12 are typically located on shelf edges and display price and other information to aid the consumer as well as the store employees. Although in the present embodiment, the WDT 12 is shown positioned at the shelf edge, the WDT 12 can be located on peg hooks or near products as set forth in U.S. patent application Ser. No. 11/019,978 titled "Wireless Display Tag" filed on even date herewith; U.S. patent application Ser. No. 11/019,660 titled "An Error Free Method for Wireless Display Tag Initialization" filed on even date herewith; and U.S. patent application Ser. No. 11/019,494 titled "RF Backscatter Transmission with Zero DC Power Consumption" filed on even date herewith, all of which are incorporated herein by reference. In addition to the WDTs described below, the combination of backscatter and active radio technologies described below in the context of a WDT may also be used for access points, portable terminals (a processor based device) and chips. Thus, a device with the combination of backscatter and active radio technologies may be a display tag (a wireless tag that has display capabilities), a tag (a wireless tag that does not have display capabilities), an access point, a portable terminal or a chip.

Each of the WDTs 12 communicate via radio frequency with a wireless access point device or Access Point (AP) 14. The AP 14 can be placed at any convenient location in the store that allows for acceptable radio communication with each of the WDTs 12 that the AP 14 supports. Any number of APs 14 can be used, depending on the number of WDTs 12 that are present in the store and the number of WDTs 12 that each AP 14 is assigned to support. The AP 14 is also in communication, either through a wire medium or wirelessly through the air, with an In-Store Server (ISS) computer, not shown.

Figure 2A:
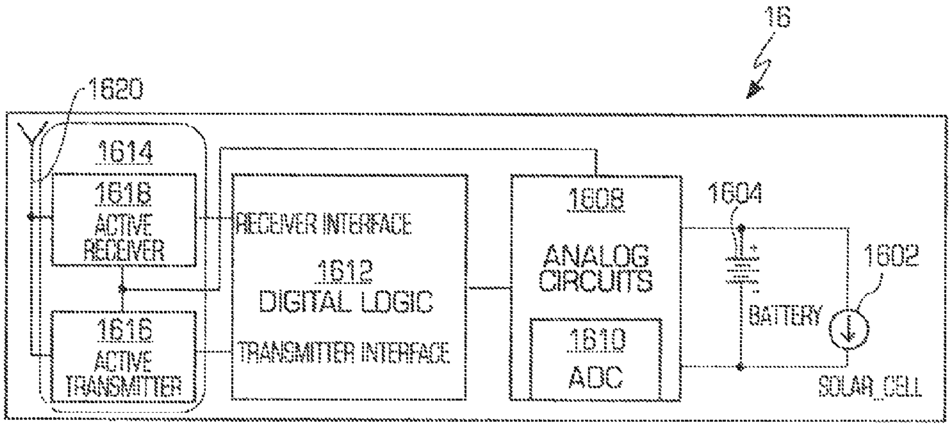
FIG. 2*a* shows an active transceiver portion of a WDT in accordance with the present invention.

Referring now to FIGS. 2*a*, an active WDT 16 includes a solar cell 1602 and a battery 1604. The solar cell 1602 may be used to charge the battery 1604 and/or power the circuits. The battery 1602 of the WDT 16 is coupled to an analog circuit unit 1608 that includes an analog-to-digital converter (ADC) 1610. The analog circuit unit 1608 is coupled to a digital logic unit 1612. Both the analog circuit unit 1608 and the digital logic unit 1612 are each coupled to an active transceiver 1614 that is coupled to an antenna 1620. The active transceiver 1614 includes an active transmitter 1616 and an active receiver 1618, each of which are coupled to a transmitter interface and a receiver interface, respectively, of the digital logic unit 1612.

Figure 2B:
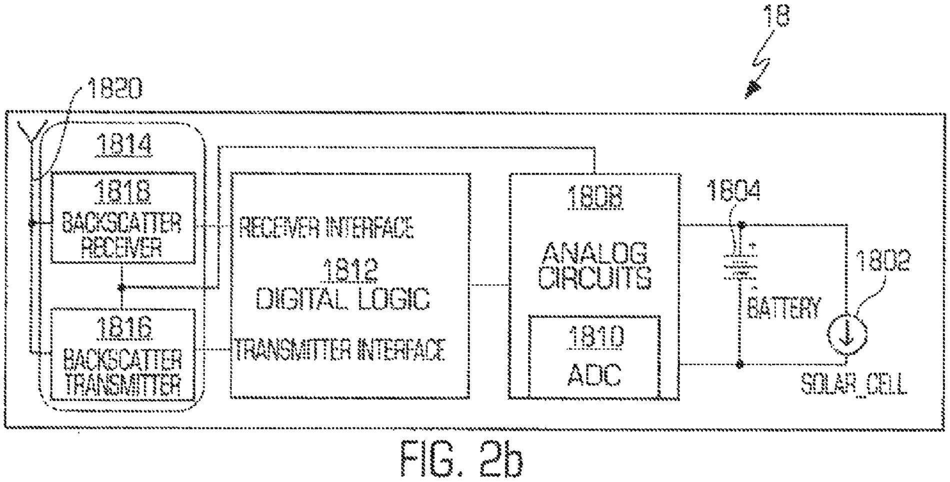
FIG. 2*b* shows a backscatter transceiver portion of a WDT in accordance with the present invention.

Referring now to FIGS. 2*b*, a backscatter WDT 18 includes a solar cell 1802 and a battery 1804. The solar cell 1802 may be used to charge the batter 1804 and/or power the circuits. The battery 1802 of the WDT 18 is coupled to an analog circuit unit 1808 that includes an analog-to-digital converter (ADC) 1810. The analog circuit unit 1808 is coupled to a digital logic unit 1812. Both the analog circuit unit 1808 and the digital logic unit 1812 are each coupled to and backscatter transceiver 1814 that is coupled to an antenna 1820. The backscatter transceiver 1814 includes an backscatter transmitter 1816 and an backscatter receiver 1818, each of which are coupled to a transmitter interface and a receiver interface, respectively, of the digital logic unit 1812.

Figure 2C:
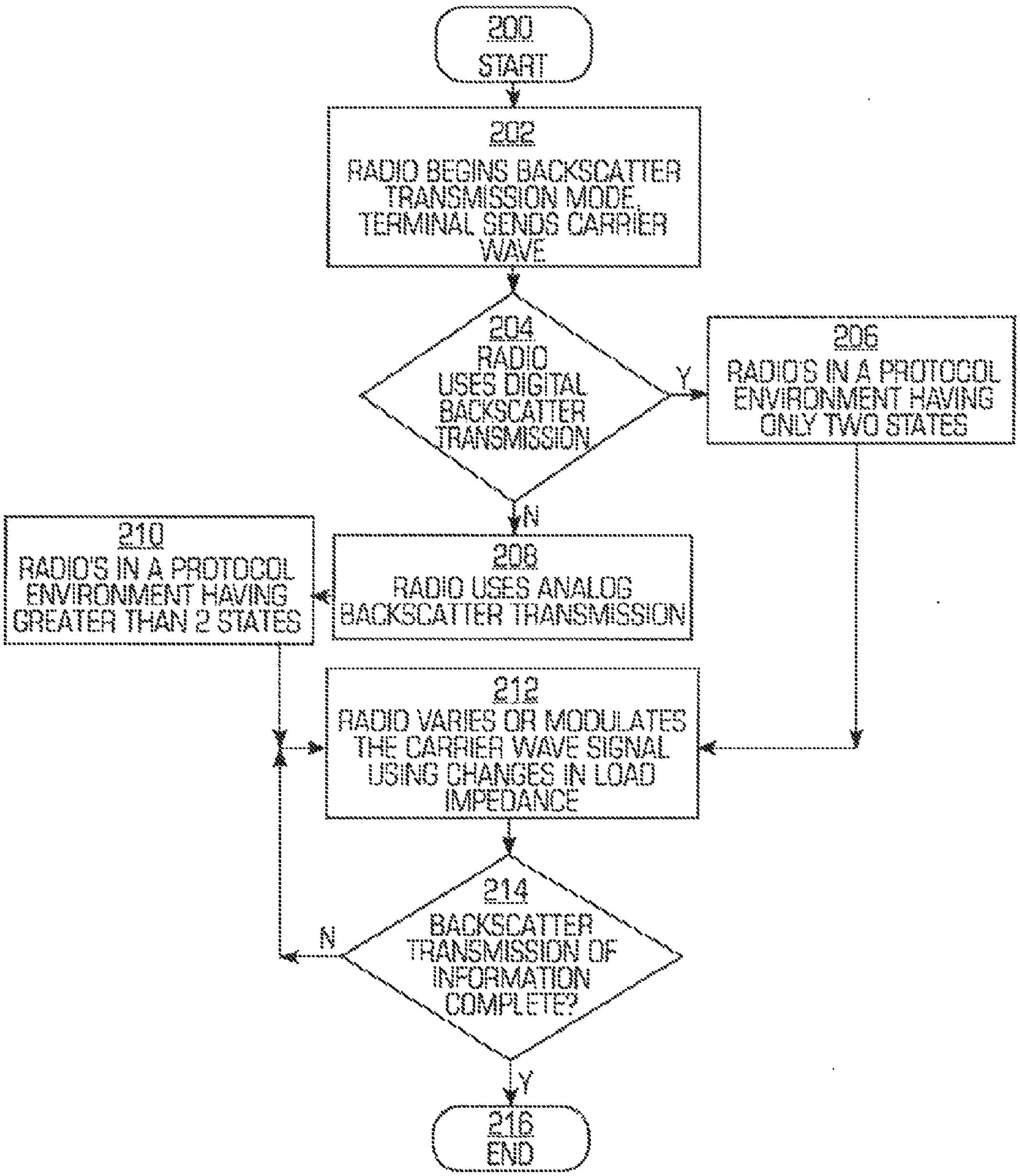
FIG. 2*c* shows a flow chart for the transceivers of FIGS. 2*a* and 2*b* in accordance with the present invention.

Referring now to FIG. 2*c*, the process of active and backscatter transmission begins at step 200. At step 202, the radio begins communication with the terminal using backscatter transmission mode and the terminal send the carrier wave to the radio. At step 204 it is determined if the radio can used digital backscatter transmission. If the radio can use digital backscatter transmission, the at step 206 it is determined that the radio is operating in a protocol environment that uses only two states. Then the process moves to step 212 as discussed below. If at step 204 it is determined that the radio can used digital backscatter transmission, then at step 208 the radio uses analog backscatter transmission. At step 210 it is determined that the radio is operating in a environment that has greater than two states. At step 212, the radio modulates the carrier wave signal using changes in load impedance to represent the information that needs to be transmitted. At step 214 it is determined if the information using backscatter transmission is complete. If so, then the process ends at step 216; if the transmission of the information is not complete, then the process returns to step 212 to continue encoding the carrier wave with the information using impedance modulation.

Figure 3:
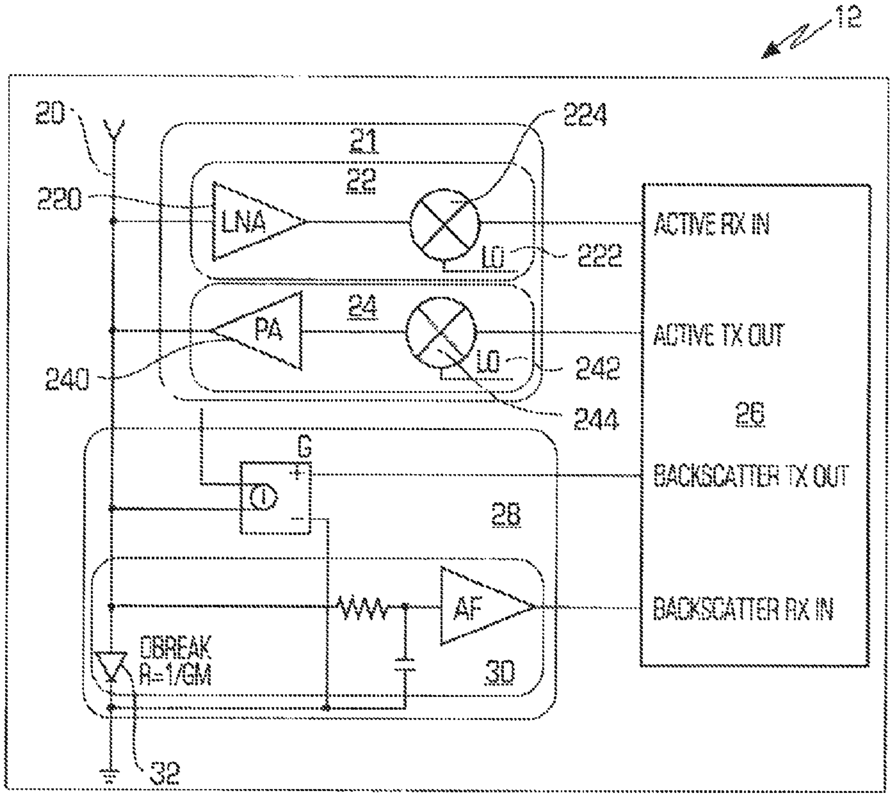
FIG. 3 shows a WDT having an active transceiver and a backscatter transceiver in accordance with the present invention.

Referring now to FIG. 3, each WDT 12 acts as a radio transceiver and includes an antenna 20; an active transceiver unit 21, which includes a receiver 22 and a transmitter 24; a digital logic component 26; and a backscatter transceiver 28. The radio communication between the WDT 12 and the AP 14, of FIG. 1, is accomplished using the receiver 22 and the transmitter 24. For information that the WDT 12 is receiving, the receiver 22 takes the incoming radio information from the antenna 20 and processes the information in a manner that the digital logic 26 can use. For information that the WDT 12 is transmitting, the transmitter 24 takes the information from the digital logic 26 and processes the information so that the information can be sent wirelessly, via the antenna 20, using radio waves. The receiver 22 and transmitter 24 are made primarily with analog circuits. In contrast, the logic 26 is made with digital circuits.

The active transceiver 21 of the WDT 12 includes the active transmitter 22 that allows greater range since the signal being transmitted can be larger in power compared to backscatter transmissions by the backscatter transceiver 28. This is because the signal that is reflected in the backscatter transceiver 28 is limited by the signal that is received. If the signal received is small, then the signal transmitted will be small.

The active transmitter 24 transmits the signal using single conversion, dual-conversion, direct modulation of a VCO or PLL. However, the scope of the present invention is not limited by the techniques can be used for transmission The signal transmitted is not limited by the signal that was received The power is limited by governmental regulations.

In one embodiment, the WDT 12 includes active circuits and devices, such as a super-heterodyne or direct conversion radio for communications. The active radio allows greater range since the receivers can be made electrically quieter. There are fundamental limits on how small of a radio signal can be recovered include the effects of thermal noise levels relative to the signal levels. The active transceiver 21 of the WDT 12 adds only a small amount of noise to the fundamental minimum level of noise, as set forth and computed in equation (1) below. The added noise can be less than 1 dB, which is in contrast to the minimum backscatter excess noise of about 114 dB.

$$P_{noise}=kTB=-174 \text{ dBm in 1 Hz bandwidth}$$

$$k=\text{Boltzmann's constant}=1.38*10^{-23}\ J/K$$

$$T=\text{temperature, } ^\circ \text{ K.}$$

$$B=\text{bandwidth, Hz}$$

Backscatter Transceiver, Direct Conversion Receiver, and Direct-Conversion Transmitter Referring now to FIG. 3, the WDT 12 includes a backscatter transceiver 28 and an active transceiver 21; the WDT 12, in this embodiment, involves a direct-conversion receiver 22 and direct-conversion transmitter 24. The direct conversion receiver 22 and the direct conversion transmitter 24 result in a reduced parts count; therefore, lower cost, and potentially lower power consumption.

The backscatter transceiver 28 has a receiver 30 that includes a diode 32. The receiver 30 is known as a "crystal radio" and the diode 32 is a low-turn-on voltage device, such as a Schottky diode. The receiver 30 is used when the WDT 12 is deployed in an amplitude modulated (AM) communication environment. The incoming RF signal is rectified with the diode 32. The rectified signal is sent to an audio amplifier from the Schottky diode and the incoming signal from the antenna 20 is AM using the Schottky diode. A filter, often a simple resistor-capacitor filter, is used to filter out the remaining RF, carrier, portion of the signal, leaving the lower-frequency modulating information.

Figure 4:
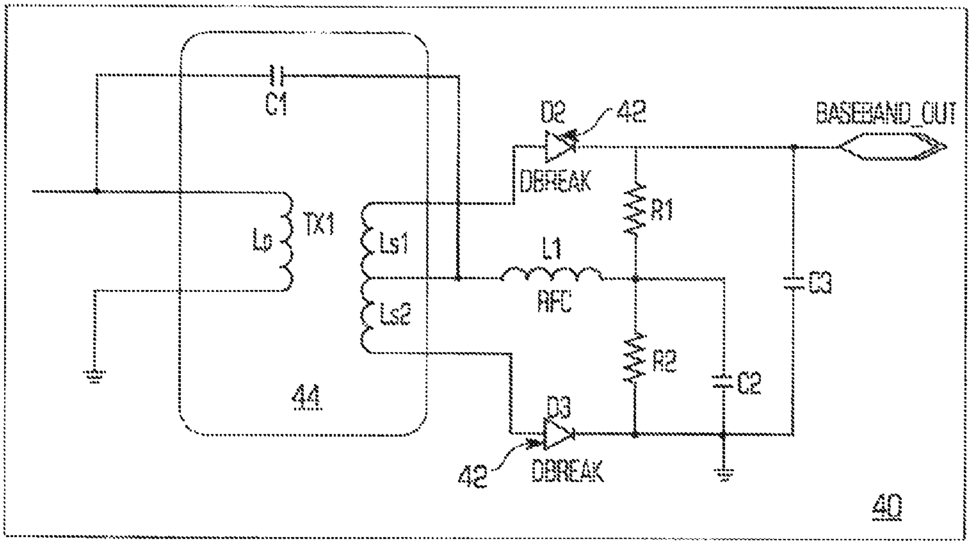
FIG. 4 shows a ratio detector in accordance with the present invention.

Referring now to FIG. 4, in an alternative embodiment, wherein the WDT 12 is deployed in a frequency modulated (FM) communication environment, an FM discriminator receiver 40 replaces the receiver 30 of FIG. 3. The receiver 40 includes diodes 42 and a transformer 44. The receiver 40 uses passive circuitry for the backscatter communications. Note that both circuits are passive. The receiver 40 changes or modulates the frequency of the high-frequency signal to the lower-frequency modulating information. The receiver 40 operates within the linear range of operating point of the diodes 42. When the instantaneous frequency of the carrier signal from the AP14 increases slightly, the output amplitude linearly increases. The inverse occurs when the frequency decreases slightly. Therefore, the FM signal is detected with a passive circuit.

An alternative embodiment includes a circuit called the ratio detector, wherein the instantaneous frequency operation causes an equivalent voltage in equal amplitude but opposite polarity across either side of the secondary. A tap is used to set the level. Therefore, the output is based on a ratio. Because it is a ratio, the undesired AM signal is rejected and only the desired FM signal is detected.

The impedance terminating the transmitter's antenna can be in one of three general states: open, short, or the same impedance as the antenna's characteristic impedance as disclosed in the Related Applications filed filed on even date herewith entitled RF Backscatter Transmission with Zero DC Power Consumption. If the terminating impedance is an open, then the signal propagates without change. If the impedance terminating the antenna is equai to the antenna's characteristic impedance, then the power reflected from the antenna is as much as the antenna absorbs. The characteristic impedance is created electronically by allowing a controlled current from a controlled current source to flow through the diode. If the impedance terminating the antenna is a short (i.e. low impedance), then the power reflected from the antenna is approximately four times the value when connected to the antenna's characteristic impedance.

Referring again to FIG. 3, the direct conversion receiver 22 operates by amplifying, then mixing the frequency down to baseband. An optional low-noise amplifier (LNA) 220 increases the modulated RF signal to decrease the signal's susceptibility to noise. The LNA 220 is followed by a mixer 224. The signal frequency of the local oscillator (LO) 222 is the same as the incoming RF signal. Therefore, the output frequency of the mixer 224 is the desired modulated signal. Optionally, there are filters to reject undesired signals (not shown). The filters may be before the LNA 220, in between the LNA 220 and the mixer 224, and finally after the mixer 224.

The direct-conversion transmitter 24 includes a power amplifier 240 and is driven by the modulating signal which is fed to a mixer 244. A LO's 242 frequency of the mixer 244 is the desired RF output frequency. The output of the mixer 244 is at the desired RF output frequency and the signal modulated. The output power is increased by the PA 240. Then the signal that is generated by the PA 240 is fed to the antenna 20.

The tag radio may also use various different electromagnetic signals (EM signals) to communicate with the terminal. For example, the EM signals may be radio frequency (as described above), infrared, light, laser and other electromagnetic signals that can be used to communicate data between the tag radio and the terminal.

Figure 5:
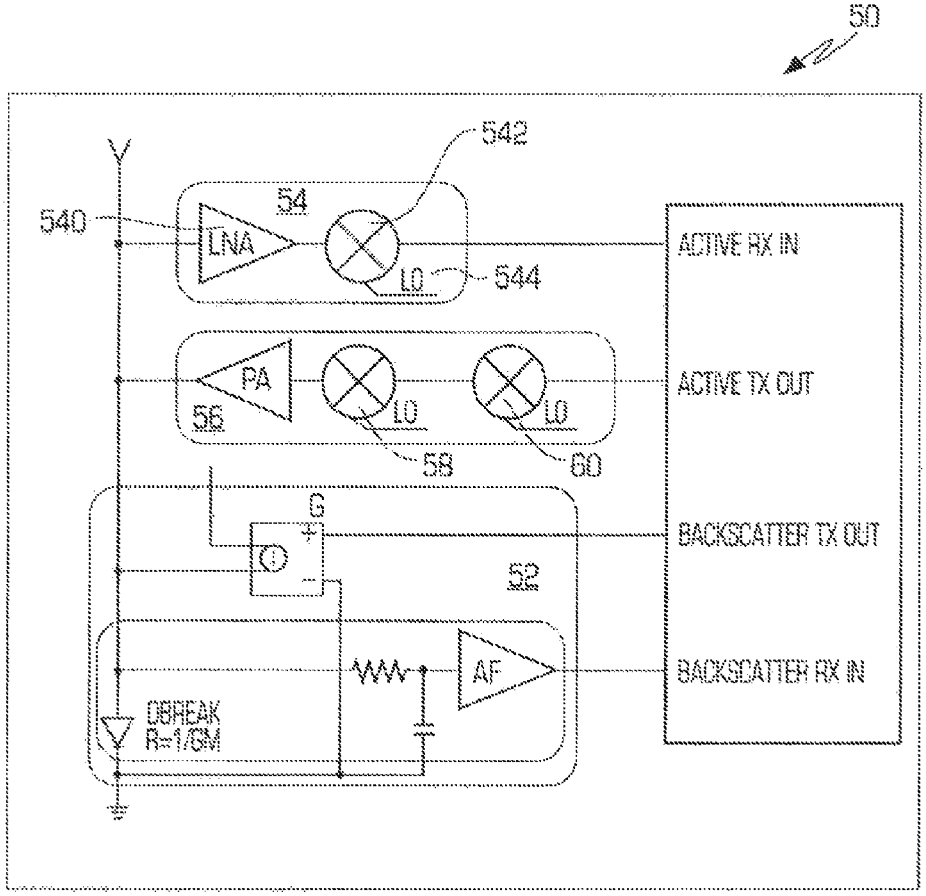
FIG. 5 shows a WDT that includes a backscatter transceiver, a super-heterodyne receiver, and a dual-conversion transmitter in accordance with the present invention.

Backscatter Transceiver, Super-Heterodyne Receiver, and Dual-Conversion Transmitter Referring now to FIG. 5, in an alternative embodiment, a device 50 includes a backscatter transceiver 52, a single-conversion active radio receiver 54, and dual-conversion transmitter 56. A single-conversion receiver with IF output is also called a super-heterodyne receiver. The backscatter transceiver 52 is similar in operation to the backscatter transceiver 28 of FIG. 3.

The single-conversion receiver 54 functions by converting the incoming signal to an intermediate frequency (IF). Since the IF is typically at a lower frequency, the filters are easier to implement. Furthermore, the gain of the device 542 is higher, so the overall system gain is larger. Moreover, the filters can be designed to provide rejection of the undesired image frequency.

The receiver 54 includes a LNA 540 at the input to decrease the desired signals' susceptibility to noise. The LNA 540 output is fed to a mixer 542 which typically reduces the frequency. A local-oscillator (LO) 544 stimulates the other input port of the mixer 542. The LO 544 is specifically chosen so that the output frequency of the mixer 542 is higher than the baseband signal. The active receiver 54 differs from the active receiver 22 of FIG. 3 in that the difference in output frequency significantly changes the behavior of the active receiver 54. The IF higher than the baseband prevents DC offsets, reduces IM2 requirements, greatly reduces LO antenna radiation, to mention a few features.

The active transmitter 56 increases the output frequency in two steps. First, mixers 58 and 59 with its associated LO are used for each step. In alternative embodiments, order to reduce the circuitry requirements of the LQ, the two LOs can be integer multiples of each other. That way, a divider can be driven by the larger frequency LO, and generate the smaller-frequency LO. A PA is used to increase the output power to drive the antenna.

Backscatter Transceiver, Image-Reject Receiver, and Dual-Conversion Transmitter

Figure 6:
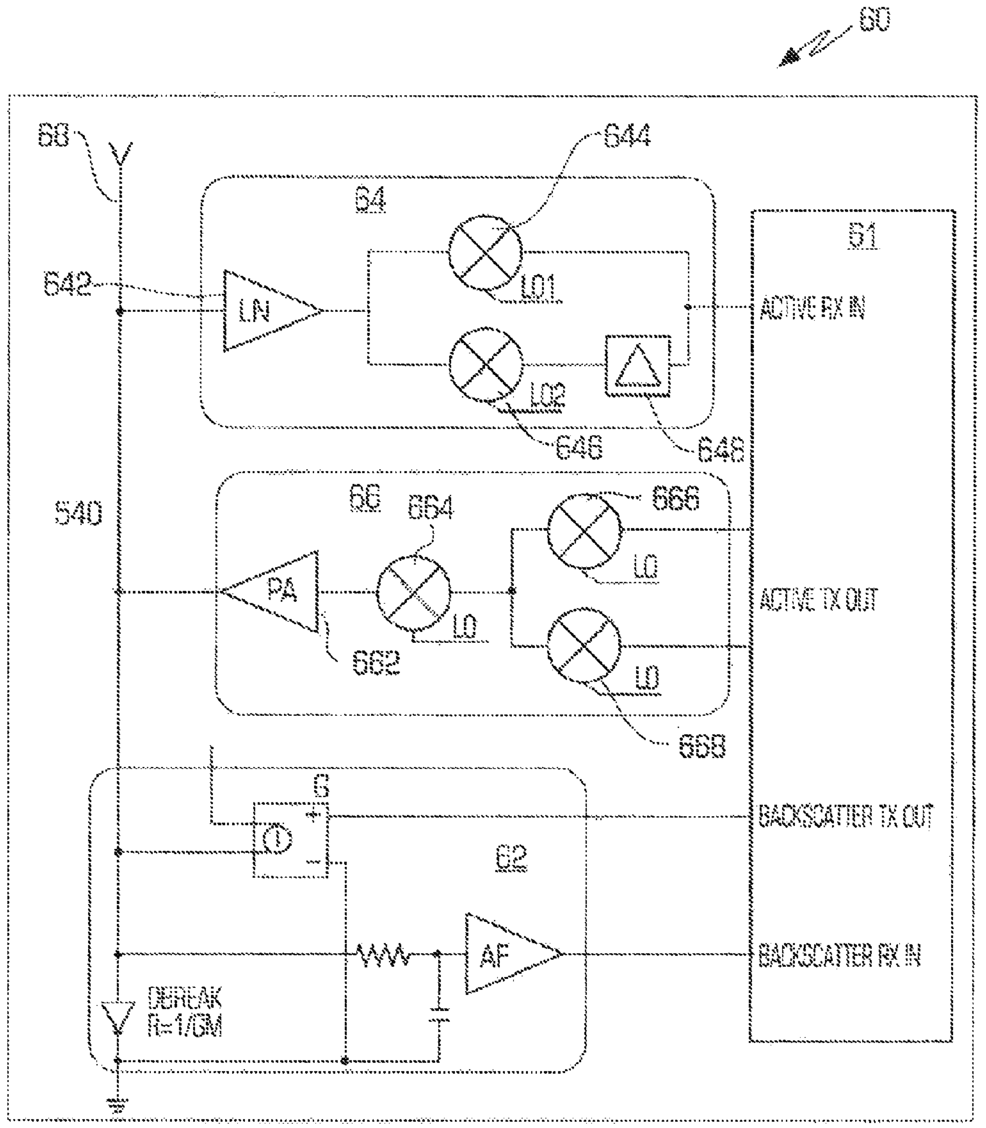
FIG. 6 shows a WDT that includes a backscatter transceiver, an image-Reject Receiver, and a dual-conversion transmitter in accordance with the present invention.

Referring now to FIG. 6, in another embodiment, the device 60 includes a backscatter transceiver 62, an image-rejection receiver 64, and a dual-conversion transmitter 66. The backscatter transceiver 62 is similar in operation to the backscatter transceiver 28 of FIG. 3.

The receiver 64 is an image-rejection configuration, wherein the undesired image frequency is mathematically cancelled. The antenna 68 is connected to a LNA 642 to reduce noise. The output of the LNA 642 is connected to two mixers 644 and 646. The LO of the mixers 644 and 646 are separated by 90°. In addition to the 90° separation caused by the LO, and additional 90° shift is introduced by shifting the output of mixer 646 by 90° using a delay block 648. Thus, there is a 180° separation between the output of mixer 644 and the mixer 646. Then the output from the mixer 644 and the mixer 646 are summed by connecting the outputs together. In this manner, the undesired image frequency is reduced or nearly eliminated.

The baseband from a digital logic unit 61 drives the input of the dual-conversion transmitter 66. The baseband is separated into real and quadrature components. Each component drives each of the mixers 664, 666, and 668. The mixers 666 and 668 have the same LO frequency, but are separated by 90° whereas the LO frequency for the mixer 664 operates at a different frequency than the LO frequency of the mixers 666 and 668. Thus, the phase of the LO for the mixers 666 and 668 is separated by 90°. Thereby the undesired sideband is reduced. The output frequency is lower then the RF output frequency. This is done because the circuitry to reduce the undesired sideband has better performance at lower frequencies. After the signal is generated, it is increased in frequency again, this time to the RF output frequency. A PA 662 is used to increase the output power as required to drive the antenna.

Backscatter Transceiver, Weaver Receiver, and Open-Loop Modulated Transmitter

Figure 7:
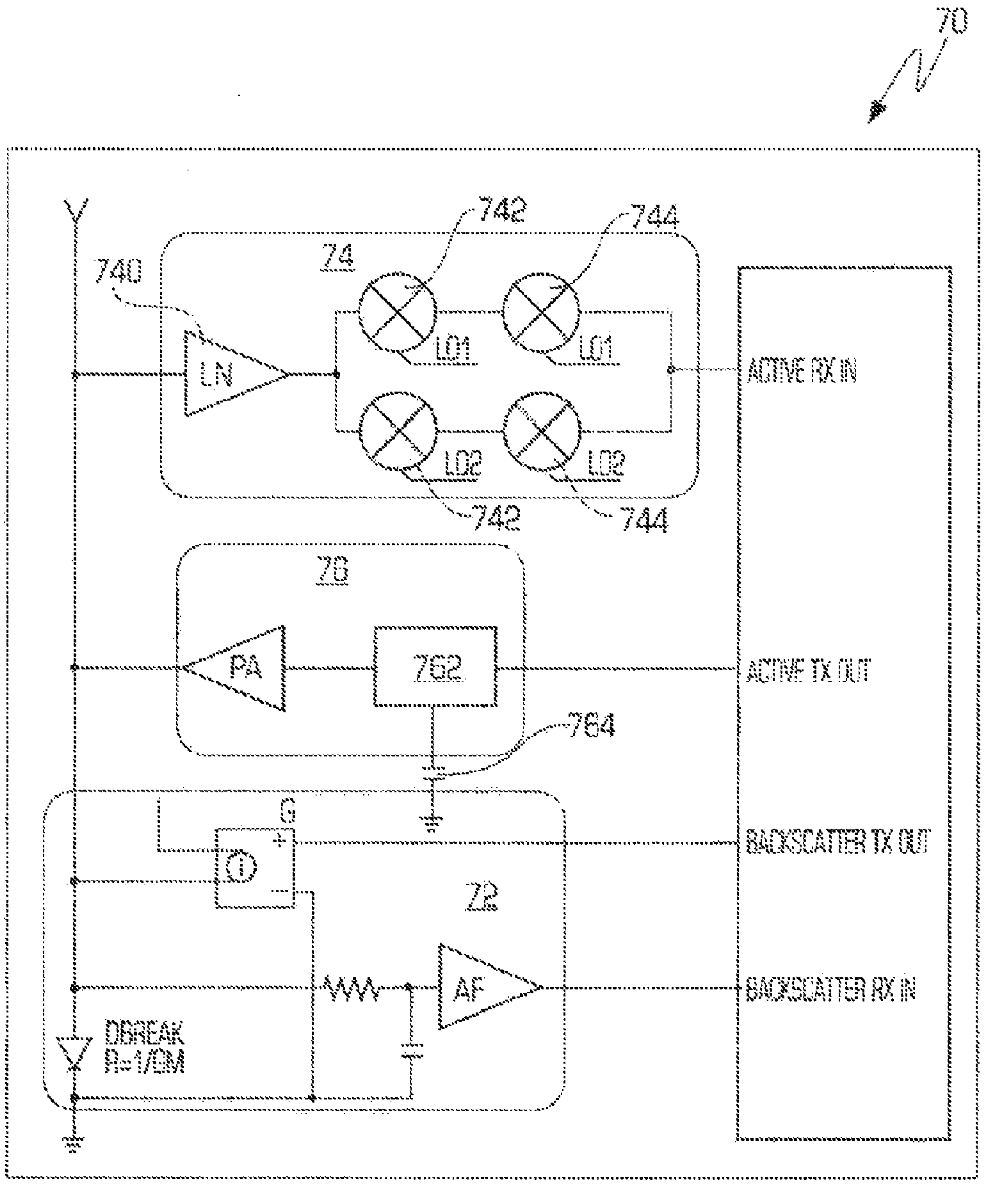
FIG. 7 shows a WDT that includes a backscatter transceiver, a Weaver receiver, and a open-loop modulated transmitter in accordance with the present invention.

Referring now to FIG. 7, in an alternative embodiment a device 70 is shown with a backscatter transceiver 72, a Weaver Receiver 74, and an Open-Loop Modulated Transmitter 76. The backscatter transceiver 72 is similar in operation to the backscatter transceiver 28 of FIG. 3. The Weaver Receiver 74 is a variation of the image-rejection mixer, which is set forth above. The Weaver architecture uses quadrature LOs because the wide-band phase shifters are difficult to practically implement.

The Weaver receiver 74 takes the signal from an antenna 78 and uses a low noise amplifier (LNA) 740 optionally to decrease the signal's susceptibility to noise. Then that amplified signal is sent to a pair of mixers 742 whose LO is driven in quadrature. The output of the mixers 742 is sent to another pair of mixer 744 with their LO driven in quadrature. The outputs of the second pair of mixers 744 are then summed. As long as the quadrature phase is correct, and the gains matched, then the image is cancelled. Note that optional filters may be inserted, one between the top pair of mixers 742 and 744 and another between the bottom pair of mixers 742 and 744. The filter is needed if the gain of the undesired sideband is large enough to cause circuit degradation.

The transmitter 76 uses the baseband signal and modulates a filter capacitor 764 of a Phase Lock-Loop 762. By this means, the LO frequency is varied by the modulating signal. This is used to drive a PA. The PA increases the output power to drive the antenna.

Note that although only 4 combinations of active transceivers were described above, all can be mixed to form any of 16 combinations.

Circuits

Figure 8:
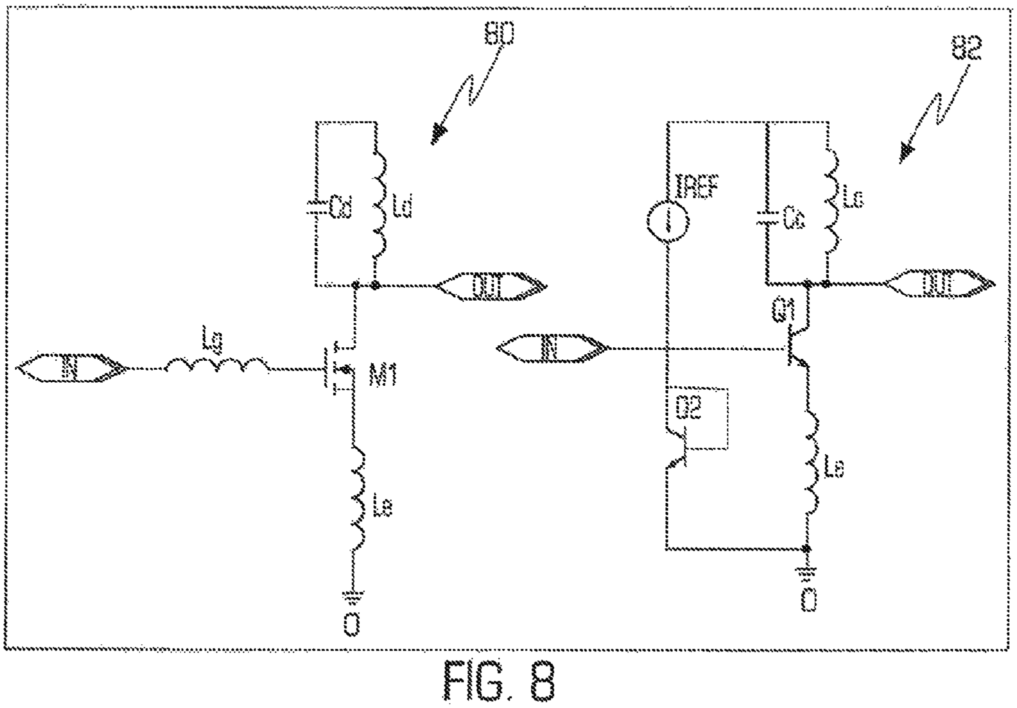
FIG. 8 shows a WDT LNA implemented in CMOS or BJT technology in accordance with the present invention.

Referring now to FIG. 8, an LNA 80 and an LNA 82 are shown with CMOS or BJT technologies, respectively. The source and emitter respectively is degenerated. This shifts the input impedance in addition to lowering the gain. An LC tank circuit is connected to the drain/collector respectively.

Figure 9:
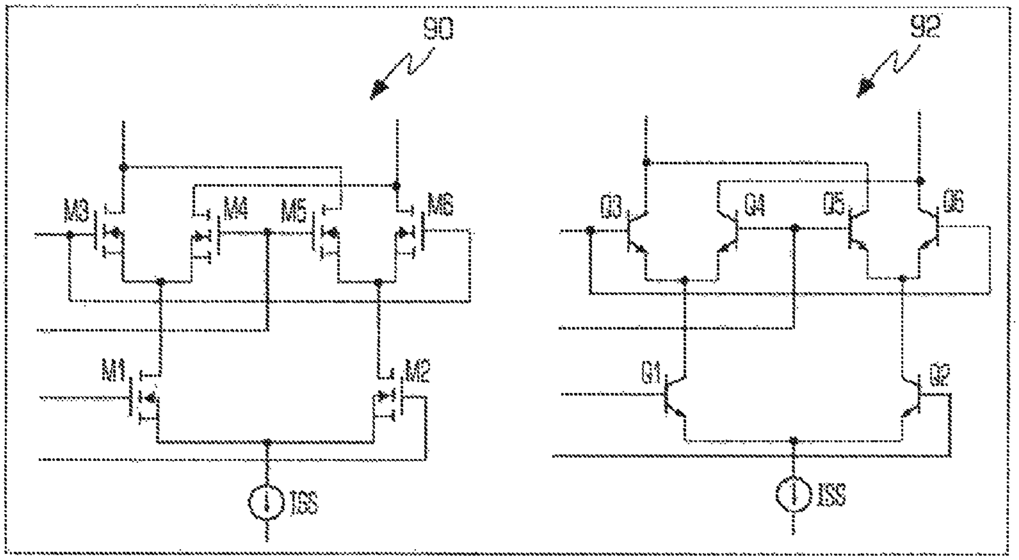
FIG. 9 shows a WDT mixer implemented in CMOS or BJT technology in accordance with the present invention.

Referring now to FIG. 9, a mixer 90 and 92 can be also implemented in CMOS or BJT technologies, respectively. The popular "Gilbert Cell" technology is shown. However, other circuits can be used.

Hookup at the Antenna

Figure 10:
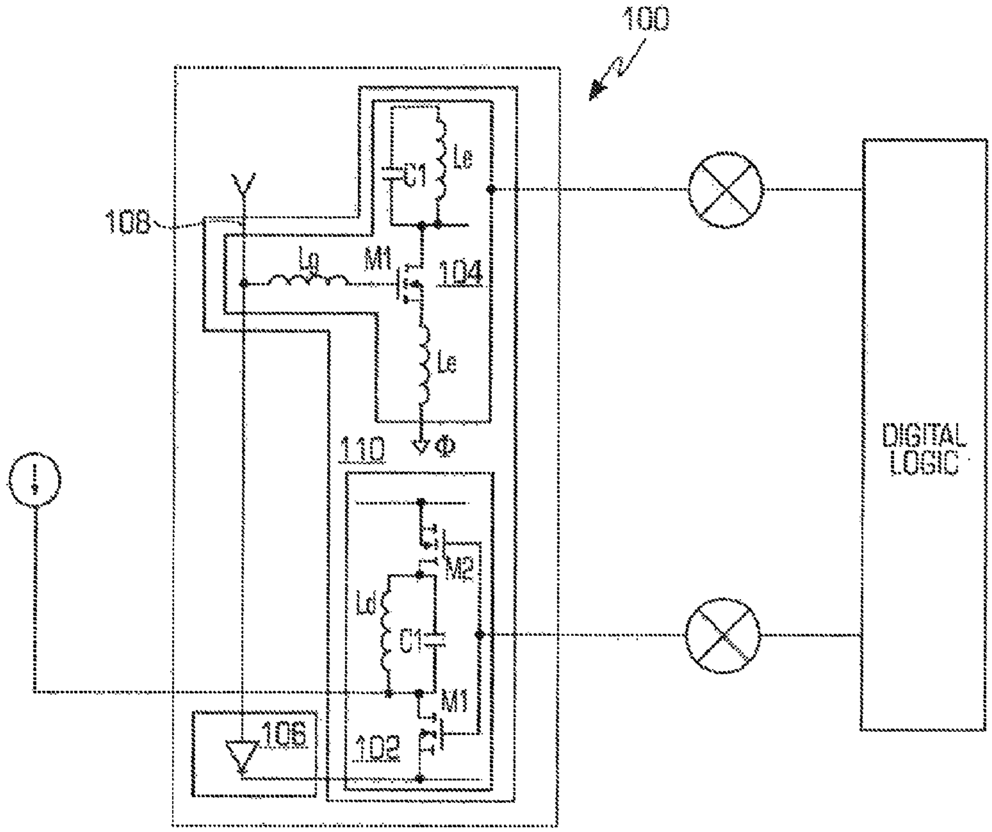
FIG. 10 shows a WDT in accordance with the teaching of the present invention, wherein the transmitter output is coupled to the receiver input.

Referring now to FIG. 10, a WDT 100 includes a transmitter 102 having an output connected to a receiver input 104. Furthermore, an active radio 110 and backscatter receiver 106 share an antenna 108. This is the preferred embodiment for a half-duplex radio where either the receiver or transmitter is on individually. Likewise, the backscatter and active radio are not on at the same time. Therefore, the power control on the not-currently used radio sections can be disabled. The not-currently used radio sections will not affect the reception or transmission of information. This is accomplished by removing power from the unused circuitry. The unused circuitry will then be in a high-impedance state since $g_m$ is related to current through the devices. The high-impedance state has little effect on the desired circuitry that is in an "on" condition. Device M2 110 is used as a switch to isolate the transmitter during receive mode, and to connect the tank to the power supply during transmit mode.

In an alternative embodiment, a full duplex radio can be implemented with the addition of filters and/or combiners. The additional elements are place in series with the inputs of the receivers and/or the output of the transmitters. In this way, the transmitter's signal does not interfere with the receiver, and the receiver picks up the desired signal, not its own undesired transmitters' signals. In addition to interference, the undesired transmit signal can overload the receiver. This has the effect of distorting the desired received signal, or worse yet overwhelming it completely so it can not be received. Another less-often-seen effect is the increase of the effective receiver noise figure. The undesired transmitter is in effect noise. The amount of undesired transmit signal that is picked up by its own corresponding receiver increases the effective noise floor. Therefore, the desired signals are increasingly difficult to receive.

Isolated Sub Blocks

Figure 11:
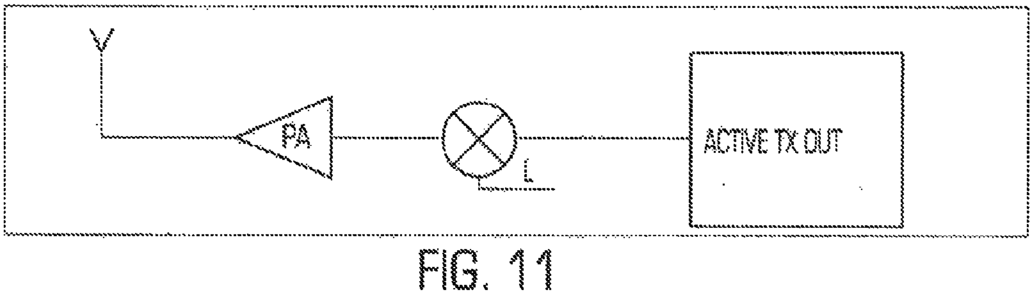
FIG. 11 shows an active transmitter portion of a WDT in accordance with the present invention.

In an alternative embodiment, a WDT can include an active transceiver without the backscatter transceiver. Referring now to FIG. 11, an active transmitter is shown coupled to an antenna. The active transmitter allows greater range since the signal being transmitted can be larger in power compared to backscatter transmission. This is because the signal that is reflected in a backscatter transmitter is limited by the signal that is received. If the signal received is small, then the signal transmitted will be small. There are no significant exceptions to this rule. An active transmitter does not use backscatter transmission techniques. The signal is received, and then transmitted using single conversion, dual-conversion, direct modulation of a VCO or PLL. However, other techniques can be used. All the techniques are well understood by one skilled in the art. The signal transmitted is not limited by the signal that was received. The power is limited by governmental regulations.

Referring again to FIG. 11, a direct-up conversion active transmitter is shown. The digital logic outputs a modulated signal. The mixer up-converts the signal to the desired radio frequency. The power amplifier increases the power to the desired level.

Figure 12:
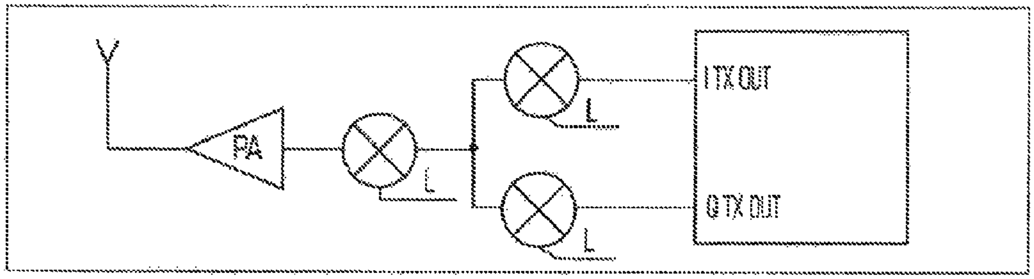
FIG. 12 shows an active quadrature transmitter portion of a WDT in accordance with the present invention.

Referring now to FIG. 12, an alternative embodiment is a quadrature modulator. The digital logic outputs two signals in quadrature. Two mixers up-convert the signals. The local oscillators for each mixer are 90° out of phase. The outputs of the two mixers are then combined in order to mathematically cancel the image frequency.

The active receiver is made from active circuits and devices. The active radio allows greater range since the receivers can be made electrically quieter. The active radio circuits used in the WDTs can be superheterodyne or direct conversion. However, other techniques can be used, such as regenerative and super-regenerative receivers.

Figure 13:
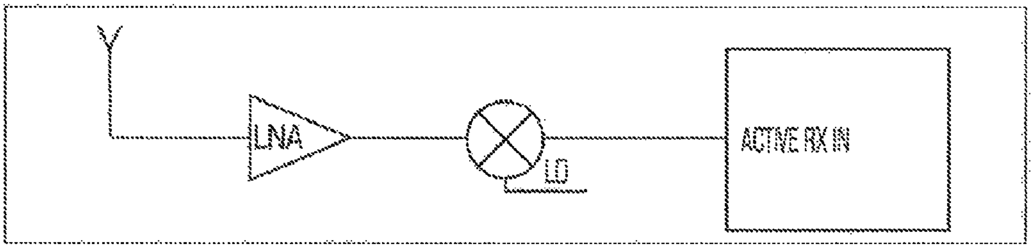
FIG. 13 shows a direct-conversion receiver portion of a WDT in accordance with the present invention.

Referring now to FIG. 13, a direct-conversion receiver includes an antenna, a LNA, a mixer, and digital logic. The signal is collected at the antenna. The LNA amplifies the signal to increase the signal strength with minor loss in signal to noise ratio. The mixer down-converts the signal from radio frequencies to baseband frequencies by mixing it with the LO. The digital logic then processes the baseband signal and extracts the useful information.

Figure 14:
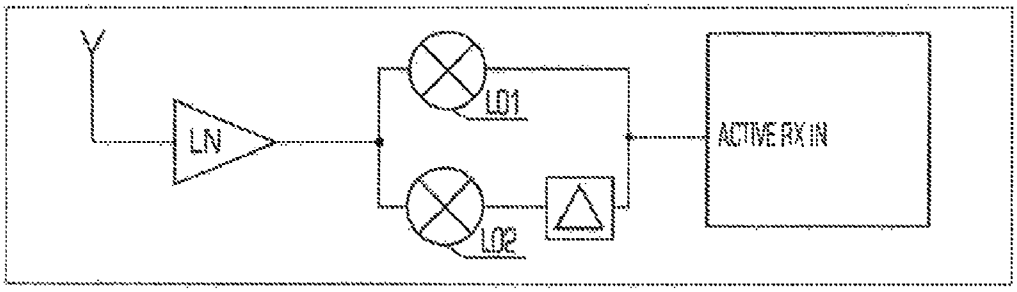
FIG. 14 shows a quadrature receiver portion of a WDT in accordance with the present invention.

Referring now to FIG. 14, an alternative embodiment for an active receiver is a quadrature receiver. The LNA amplifies the signal to increase the signal strength with minor loss in signal to noise ratio. The mixers down-converts the signal from radio frequencies to baseband frequencies by mixing it with the LO. The two LOs are separated in phase by 90°. The delay section further delays one mixer output signal by 90°. Therefore, if the image signal is presented at the antenna, it is mathematically rejected.

Figure 15:
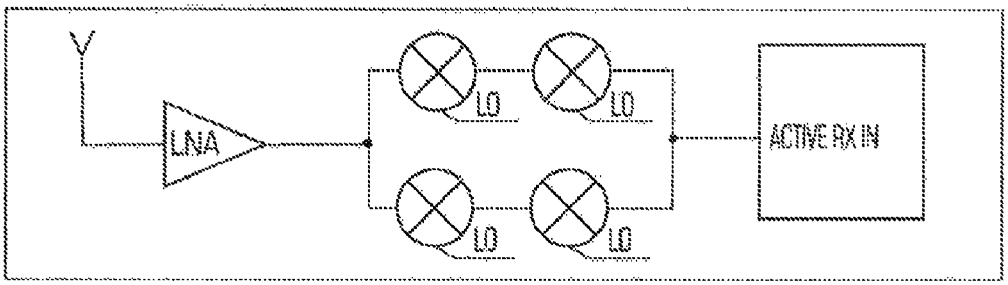
FIG. 15 shows a Weaver receiver portion of a WDT in accordance with the present invention.
Figure 16:
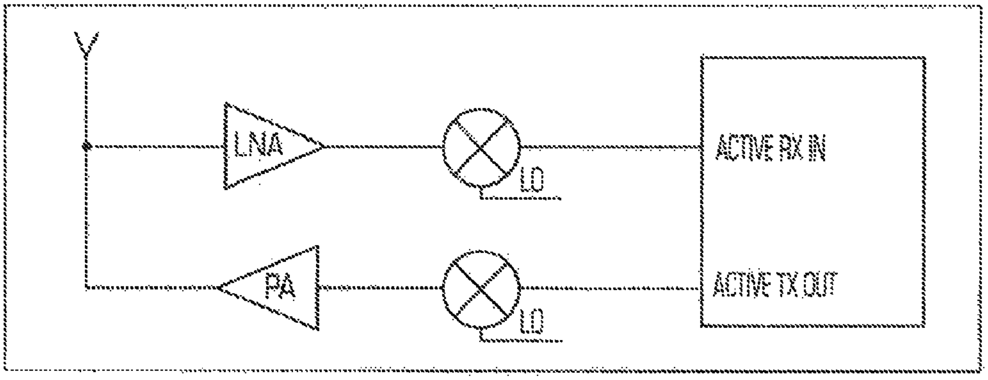
FIG. 16 shows a direct conversion receiver and a transmitter portion of a WDT in accordance with the present invention.

Referring now to FIG. 15, an alternative embodiment for a receiver is a Weaver Receiver. A Weaver Receiver minimizes the problems associated with a direct-conversion receiver, including: dc-voltage offset, LO re-radiation, and high-IIP2 (second-order input-intercept point) requirements. The Weaver Receiver is a variation of the image-rejection mixer. Wide-band phase shifters are difficult to practically implement. Therefore, the Weaver architecture uses quadrature LOs, Referring now to FIGS. 16, an alternative embodiment for an active transceiver includes the combination of a direct-conversion receiver and a direct-conversion transmitter.

Figure 17:
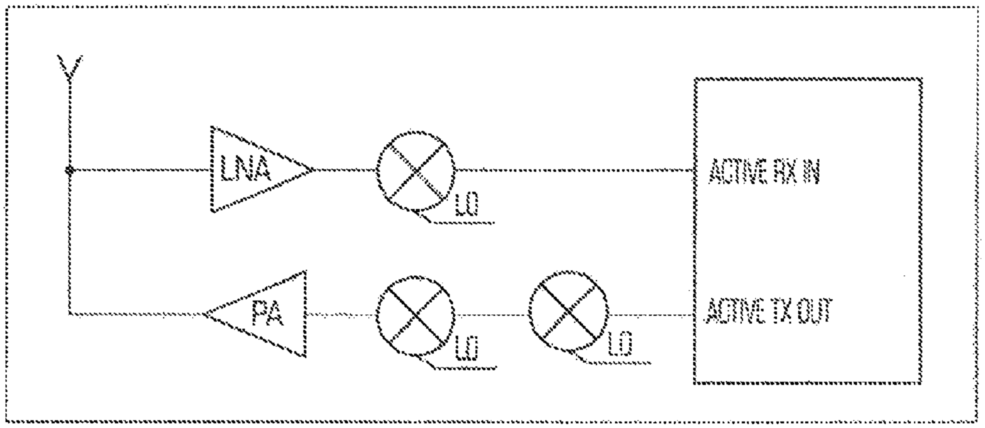
FIG. 17 show a direct conversion receiver and a dual-up conversion transmitter portion of a WDT in accordance with the present invention.

Referring now to FIGS. 17, an alternative embodiment for an active transceiver includes the combination a direct conversion-receiver and dual-up-conversion transmitter.

Figure 18:
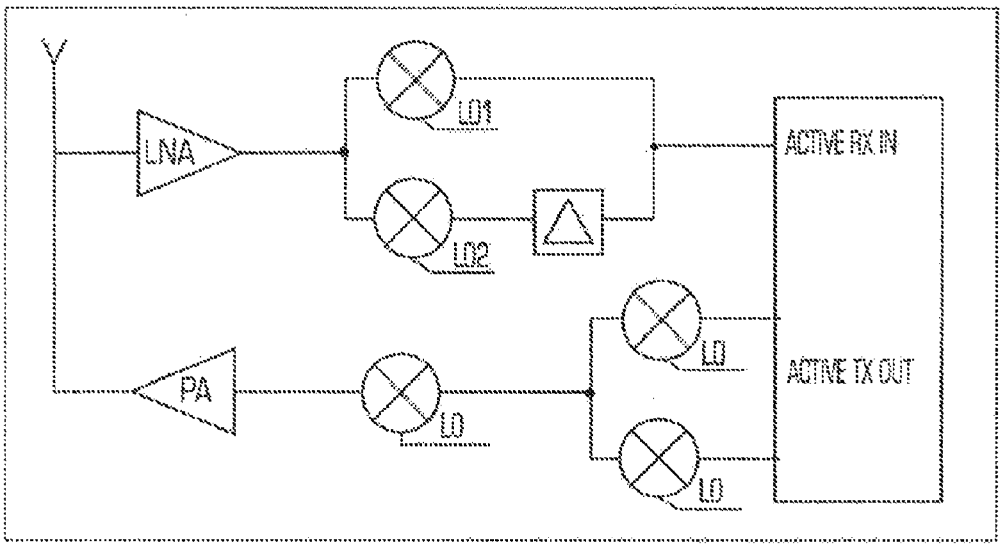
FIG. 18 shows a quadrature receiver and quadrature transmitter portion of a WDT in accordance with the present invention.

Referring now to FIGS. 18, an alternative embodiment for an active transceiver includes the combination of a quadrature receiver and a quadrature.

Figure 19:
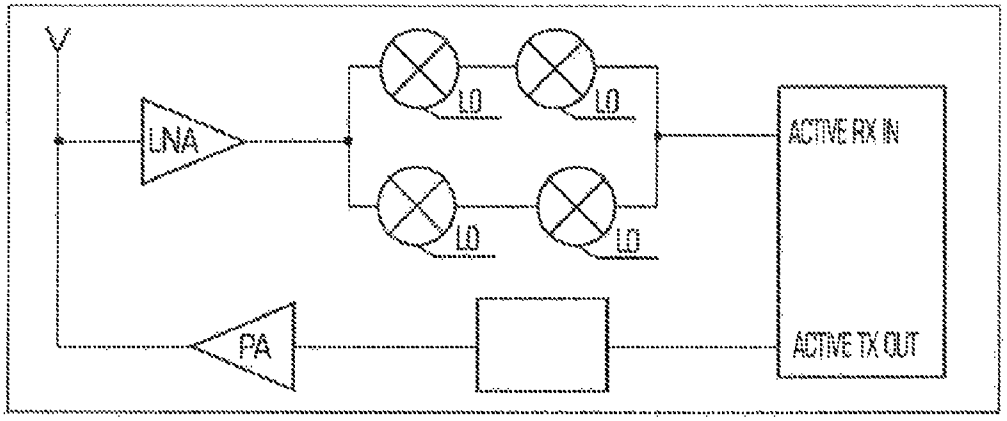
FIG. 19 shows a Weaver receiver and open-loop PLL transmitter portion of a WDT in accordance with the present invention.

Referring now to FIGS. 19, an alternative embodiment for an active transceiver includes the combination of a Weaver Receiver and an open-loop modulated PLL transmitter.

Figure 20:
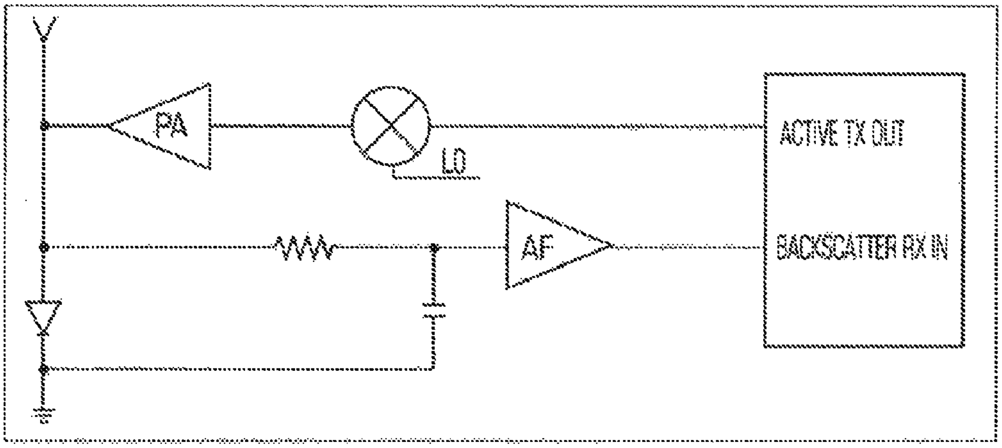
FIG. 20 shows a direct conversion transmitter and diode receiver portion of a WDT in accordance with the present invention.

Referring now to FIGS. 20, an alternative embodiment for an active transceiver includes the combination of an active transmitters with a diode receiver.

Figure 21:
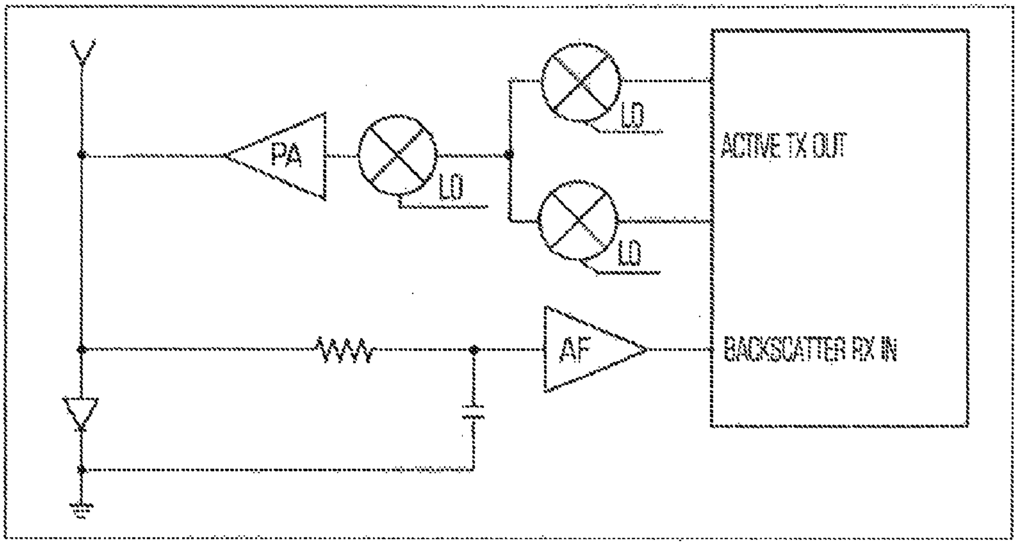
FIG. 21 shows a quadrature transmitter and diode receiver portion of a WDT in accordance with the present invention.

Referring now to FIGS. 21, an alternative embodiment for an active transceiver includes the combination of a quadrature transmitter and a diode receiver.

In an alternative embodiment, the diode receiver's performance can be improved by adding an amplifier between the antenna and the diode to amplify the signal.

Figure 22:
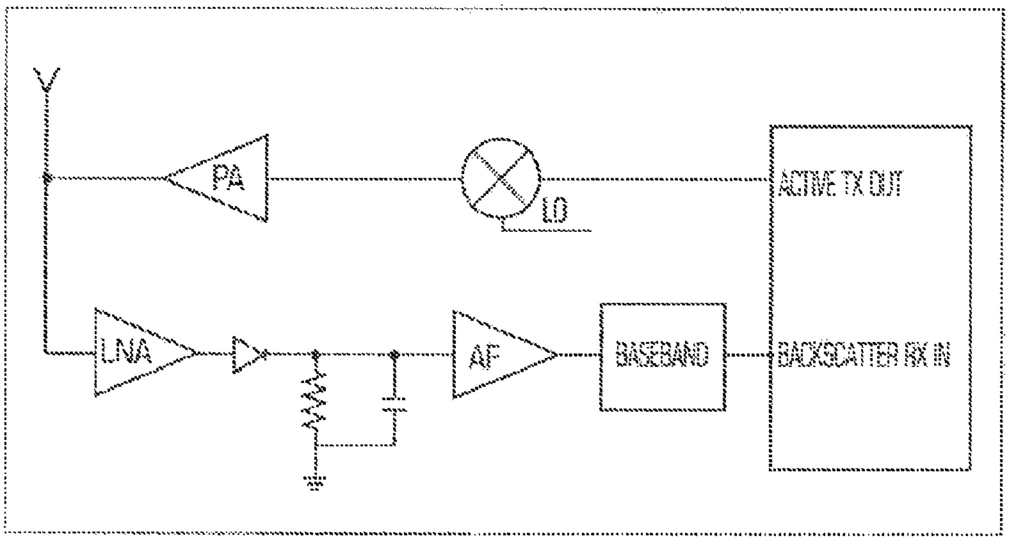
FIG. 22 shows a direct conversion transmitter and amplified backscatter receiver portion of a WDT in accordance with the present invention.

Referring now to FIG. 22, an alternative embodiment includes the combination of a direct-conversion up-converter transmitter and an amplified backscatter receiver. Note that there is potentially a feedback loop through the receive section of the radio to the transmit section. This will have to be broken electrically (analog or digitally) or mechanically during the WDT transmit time to eliminate this feedback. This can be implemented with a CMOS switch in the receive path. The switch is opened up during the receive time to isolate the receiver from the transmitter.

Figure 23:
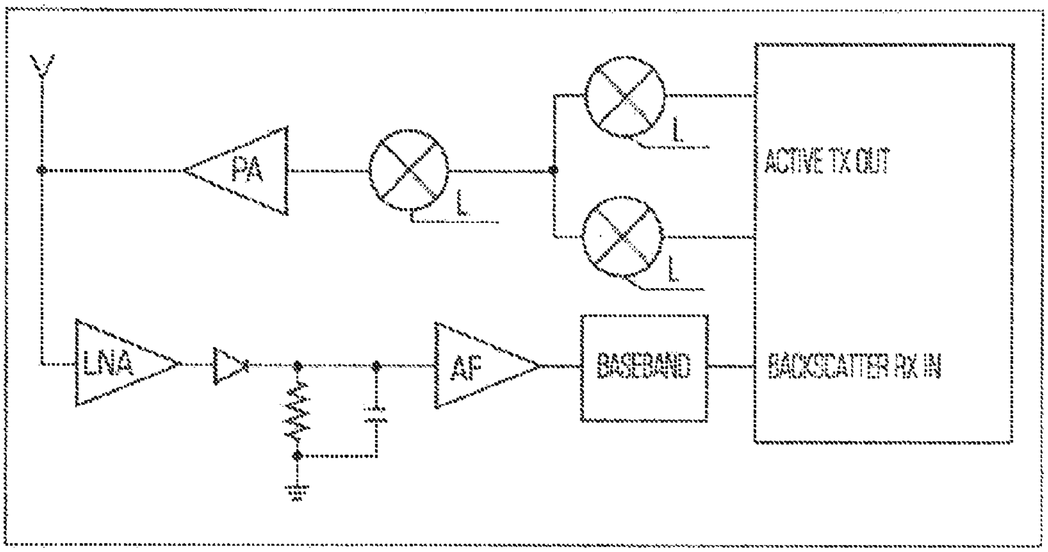
FIG. 23 shows a quadrature transmitter and amplified backscatter receiver portion of a WDT in accordance with the present invention.

Referring now to FIG. 23, an alternative embodiment includes the combination of a quadrature transmitter and an amplified backscatter receiver.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A transmission system comprising:

a tag having a radio, the radio having a backscatter transceiver coupled to an antenna wherein the backscatter transceiver has a digital backscatter transmission mode using electromagnetic signals and an analog backscatter transmission mode using electromagnetic signals and digital logic connected to the backscatter transceiver;

a terminal that communicates wirelessly with the tag, the terminal having a radio wherein the terminal radio transmits using backscatter transmission mode and sends a carrier wave signal to the tag radio;

the digital logic of the tag radio performing the processes of:

determining if the tag radio can use the digital backscatter transmission mode;

determining, if the tag radio can use digital backscatter transmission mode, that the tag radio is operating in a protocol environment that uses only two states;

using the analog backscatter transmission mode if it is determined that the tag radio cannot use digital backscatter transmission, wherein the tag radio operates in an environment that has more than two states;

modulating a carrier wave signal using changes in load impedance to represent the information that is to be transmitted to the terminal using analog backscatter transmission mode;

completing the transmission to the terminal if it is determined that the information using backscatter transmission is transmitted; and repeating the modulation of the carrier wave signal if it is determined that the transmission of the information to the terminal was not completed.

2. The system of claim 1, wherein the tag is a display tag.

3. The system of claim 2, wherein the electromagnetic signals further comprise one of a radio frequency signal an infrared signal, a light signal and a laser signal.

4. A device comprising:

an active transceiver coupled to an antenna;

a backscatter transceiver coupled to the antenna, the combination of the active transceiver and the backscatter transceiver allowing for transmission of electromagnetic signals of varying power ranges; and digital logic for selectively switching the operation of the tag from active mode to backscatter mode, thereby reducing power consumption of the device;

wherein the device communicates using radio communications.

5. The device of claim 4, wherein the device is one of a tag, a display tag, a chip, a portable terminal and an access point.

6. The device of claim 4, wherein the electromagnetic signals further comprise one of a radio frequency signal an infrared signal, a light signal and a laser signal.

* * * * *